US007042360B2

(12) United States Patent
Light et al.

(10) Patent No.: US 7,042,360 B2
(45) Date of Patent: May 9, 2006

(54) ELECTRONIC TETHER FOR PORTABLE OBJECTS

(76) Inventors: Elliott D. Light, 12 Bentana Way, Rockville, MD (US) 20850; Brian Boesch, 2939 Fort Lee St., Oak Hill, VA (US) 20171; Jon L. Roberts, 529 Clear Spring Rd., Great Falls, VA (US) 20171

( * ) Notice: Subject to any disclaimer, the term of this patent is extended or adjusted under 35 U.S.C. 154(b) by 0 days.

(21) Appl. No.: 10/911,018

(22) Filed: Aug. 4, 2004

(65) Prior Publication Data

US 2005/0005874 A1    Jan. 13, 2005

Related U.S. Application Data

(60) Continuation-in-part of application No. 10/832,498, filed on Apr. 27, 2004, which is a continuation-in-part of application No. 09/591,167, filed on Jun. 9, 2000, now Pat. No. 6,748,902, and a continuation-in-part of application No. 10/078,890, filed on Feb. 19, 2002, which is a division of application No. 09/591,167, filed on Jun. 9, 2000, now Pat. No. 6,748,902.

(51) Int. Cl.
   *G08B 13/14* (2006.01)

(52) U.S. Cl. .................. 340/572.1; 340/568.2

(58) Field of Classification Search ........... 340/539.14, 340/539.15, 573.3, 573.4, 572.1–572.9, 573.1, 340/573.2, 568.1, 568.2; 119/421, 721, 908
   See application file for complete search history.

(56) References Cited

U.S. PATENT DOCUMENTS

| 4,335,682 A | | 6/1982 | Gonda et al. | |
|---|---|---|---|---|
| 4,675,656 A | * | 6/1987 | Narcisse | 340/539.21 |
| 4,792,796 A | * | 12/1988 | Bradshaw et al. | 340/539.21 |
| 4,802,482 A | | 2/1989 | Gonda et al. | |
| 4,898,120 A | | 2/1990 | Brose | |
| 4,918,425 A | * | 4/1990 | Greenberg et al. | 340/539.3 |
| 5,054,428 A | | 10/1991 | Farkus | |
| 5,067,441 A | | 11/1991 | Weinstein | |
| 5,204,657 A | | 4/1993 | Prosser et al. | |
| 5,223,815 A | * | 6/1993 | Rosenthal et al. | 340/539.21 |
| 5,353,744 A | | 10/1994 | Custer | |
| 5,381,129 A | | 1/1995 | Boardman | |
| 5,425,330 A | | 6/1995 | Touchton et al. | |
| 5,461,365 A | * | 10/1995 | Schlager et al. | 340/573.4 |

(Continued)

OTHER PUBLICATIONS

Rob Harrill, "A watch that's smarter than you?", http://www.eurekalert.org/pub_releases/2004-10/uow-awt100604.php, Oct. 6, 2004.

(Continued)

*Primary Examiner*—Jeffery Hofsass
*Assistant Examiner*—Jennifer Stone
(74) *Attorney, Agent, or Firm*—Roberts Abokhair & Mardula LLC

(57) ABSTRACT

A system and method for issuing an alarm when the separation distance between a monitoring module associated with an object (animate or inanimate) and an alert module exceeds a preset threshold distance thereby forming a leadless electronic tether between the object and the object owner. A monitoring module comprises a portable transmitter provides a signal to an alert module comprising a receiver and a processor. The alert module is adapted to determine a separation distance between the monitoring module and the alert module based on an attribute of the signal. When the separation distance exceeds a predetermined threshold, the alert module issues an alert.

42 Claims, 6 Drawing Sheets

U.S. PATENT DOCUMENTS

| | | | |
|---|---|---|---|
| 5,465,687 A | 11/1995 | Custer | |
| 5,477,210 A | 12/1995 | Belcher | |
| 5,553,469 A | 9/1996 | Seidel | |
| 5,605,116 A | 2/1997 | Kim et al. | |
| 5,638,050 A | 6/1997 | Sacca et al. | |
| 5,642,690 A | 7/1997 | Calabrese et al. | |
| 5,646,593 A * | 7/1997 | Hughes et al. | 340/573.1 |
| 5,648,757 A | 7/1997 | Vernace et al. | |
| 5,686,891 A | 11/1997 | Sacca et al. | |
| 5,781,102 A | 7/1998 | Huang | |
| 5,790,021 A | 8/1998 | Mickel et al. | |
| 5,844,489 A | 12/1998 | Yarnall et al. | |
| 5,857,433 A | 1/1999 | Files | |
| 5,868,100 A | 2/1999 | Marsch | |
| 5,870,973 A | 2/1999 | Touchton et al. | |
| 5,939,988 A * | 8/1999 | Neyhart | 340/573.4 |
| 5,977,913 A | 11/1999 | Christ | |
| 6,011,471 A | 1/2000 | Huang | |
| 6,019,066 A | 2/2000 | Taylor | |
| 6,047,664 A | 4/2000 | Lyerly | |
| 6,064,308 A | 5/2000 | Janning et al. | |
| 6,075,443 A * | 6/2000 | Schepps et al. | 340/573.4 |
| 6,131,535 A | 10/2000 | So | |
| 6,135,060 A | 10/2000 | So | |
| 6,155,208 A | 12/2000 | Shell et al. | |
| 6,163,261 A | 12/2000 | Westrick | |
| 6,166,635 A | 12/2000 | Huang | |
| 6,166,643 A | 12/2000 | Janning et al. | |
| 6,167,843 B1 | 1/2001 | Kim | |
| 6,169,484 B1 * | 1/2001 | Schuchman et al. | 340/573.1 |
| 6,170,439 B1 | 1/2001 | Duncan et al. | |
| 6,184,790 B1 | 2/2001 | Gerig | |
| 6,191,693 B1 | 2/2001 | Sangsingkeow | |
| 6,230,661 B1 | 5/2001 | Yarnall, Jr. et al. | |
| 6,405,132 B1 | 6/2002 | Breed et al. | |
| 6,412,813 B1 | 7/2002 | Breed et al. | |
| 6,529,131 B1 | 3/2003 | Wentworth | |
| 6,577,238 B1 * | 6/2003 | Whitesmith et al. | 340/572.1 |
| 6,600,422 B1 | 7/2003 | Barry et al. | |
| 6,674,364 B1 | 1/2004 | Holbrook et al. | |
| 6,686,881 B1 | 2/2004 | Lu et al. | |
| 6,687,609 B1 | 2/2004 | Hsiao et al. | |
| 6,720,920 B1 | 4/2004 | Breed et al. | |
| 6,820,897 B1 | 11/2004 | Breed et al. | |
| 6,837,427 B1 | 1/2005 | Overhultz et al. | |
| 6,917,291 B1 * | 7/2005 | Allen | 340/572.1 |
| 2002/0198632 A1 | 12/2002 | Breed et al. | |
| 2003/0233189 A1 | 12/2003 | Hsiao et al. | |

OTHER PUBLICATIONS

Suresafe Technology Inc. Product Description, http://www.suresafe.com.

TrackIT Corp. Product Description; "Mobile Security Goes High Tech", http://ww.trackitcorp.com.

* cited by examiner

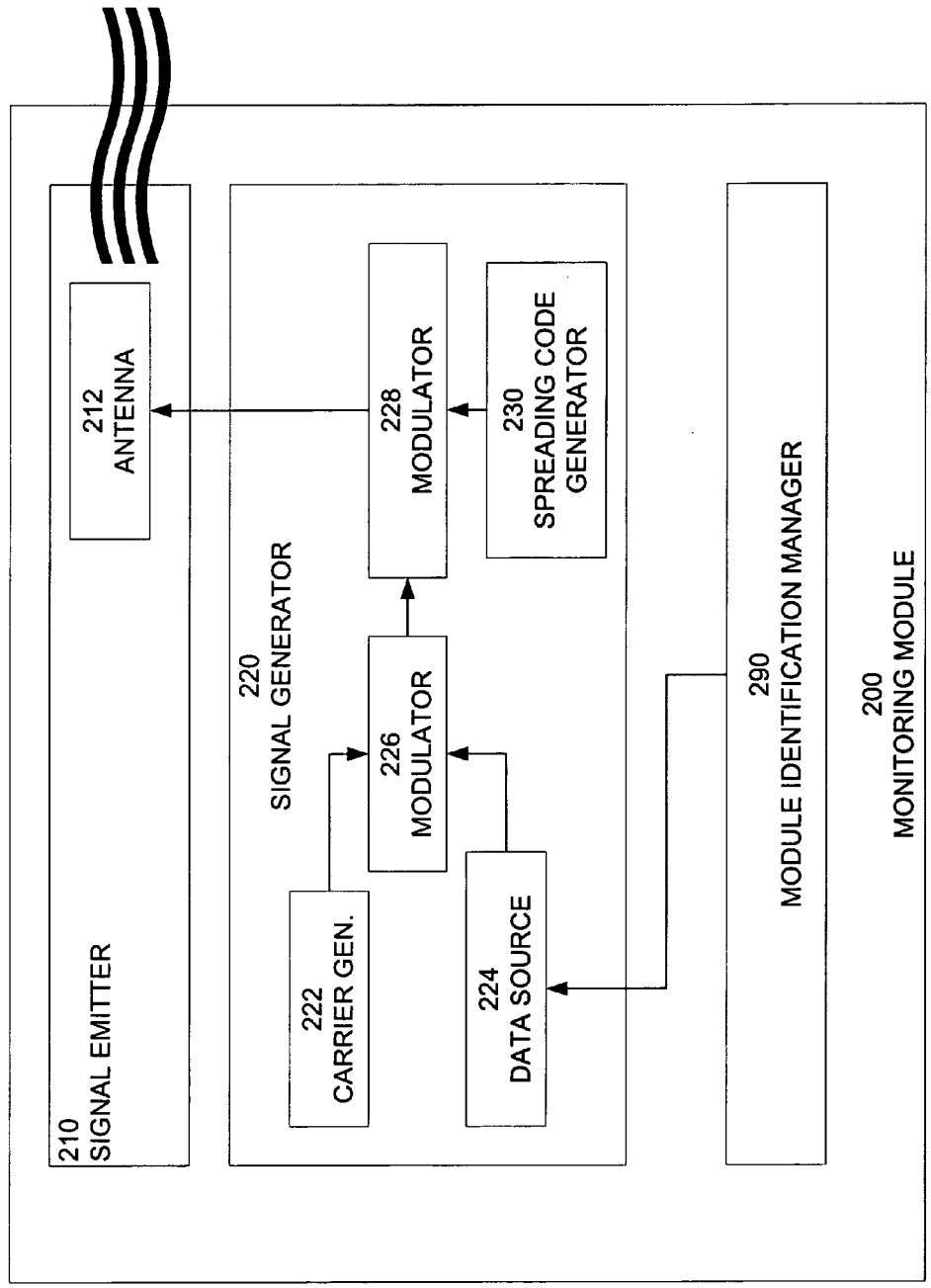

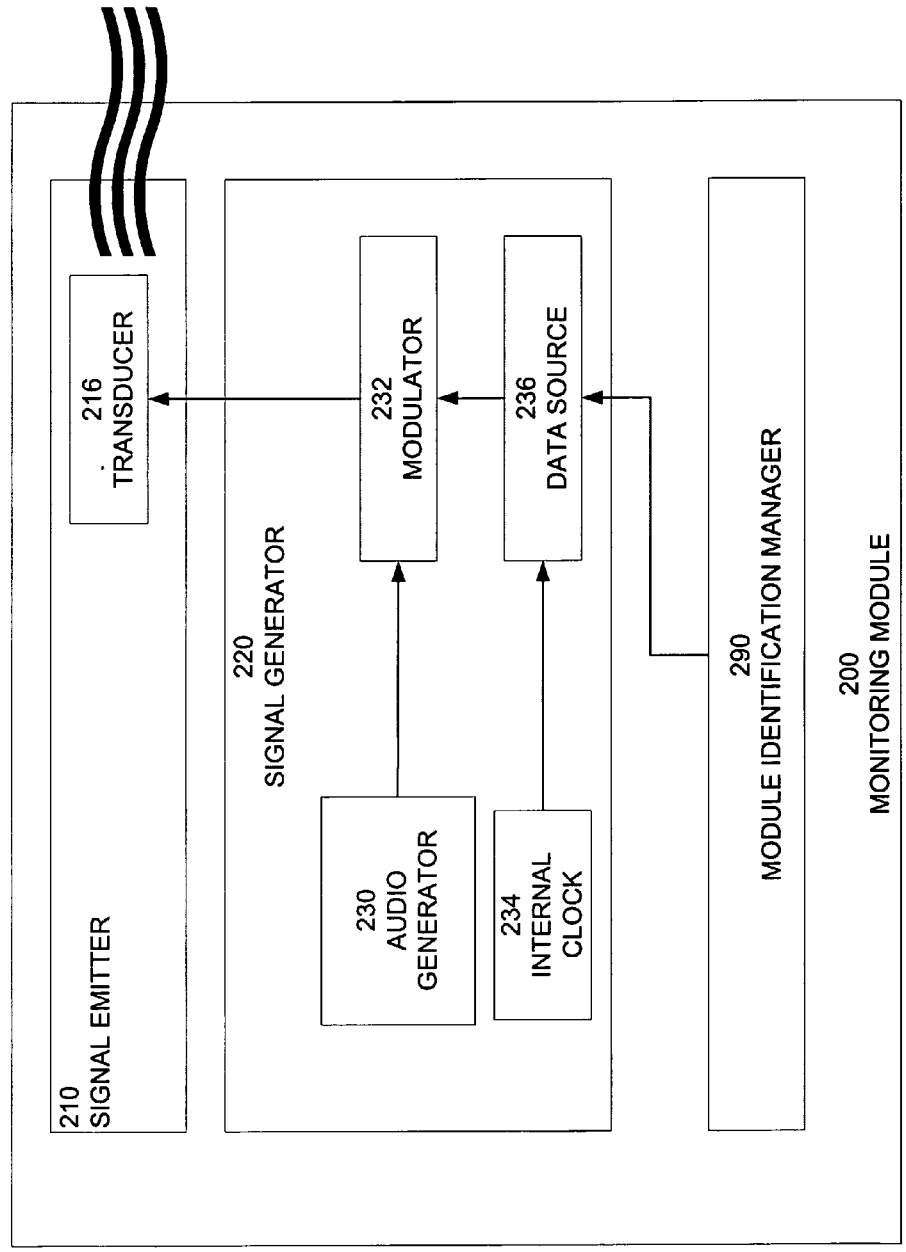

ELECTRONIC TETHER FOR PORTABLE OBJECTS

CROSS REFERENCE TO RELATED APPLICATIONS

This application is a continuation in part of application Ser. No. 10/832,498, filed Apr. 27, 2004currently pending, which is a continuation in part application of application Ser. No. 09/591,167, filed Jun. 9, 2000, now U.S. Pat. No. 6,748,902, and a continuation in part of application Ser. No. 10/078,890 filed Feb. 19, 2002, which is a divisional application of application Ser. No. 09/591,167, filed Jun. 9, 2000, now U.S. Pat. No. 6,748,902. The Ser. No. 10/832,498, the Ser. No. 10/078,890 and the Ser. No. 09/591,167 applications are incorporated herein by reference in their entirety for all purposes.

BACKGROUND

This invention relates generally to monitoring animals and inanimate objects. More particularly the present invention is a form of electronic leash for animals and an electronic "tether" for portable objects carried by individuals.

Animals and portable objects share a common attribute: they can both be lost if care is not taken to be constantly aware of their location. For example, a household pet may quickly wander from its owner at a park or other area if not secured by a leash. A camera bag may be easily left at a restaurant if not secured by a shoulder strap or other "tether."

In the field of animal training, various devices have been invented which are designed to keep animals within a confined area. For example the now ubiquitous "electronic fence" is seen everywhere as a means of keeping animals within a specific area. The electronic fence comprises a wire surrounding an area in which an animal is to be confined. An electronic current placed on the wire giving it a magnetic field and/or the wire is used as an RF transmitter. A collar is then attached to the animal which is capable of sensing the electronic field. When the strength of the electronic field is at a certain level, an audible warning is given to the animal. As the animal gets closer to the buried wire, an electronic shock is administered to the animal thereby providing a physical incentive for the animal to stay away from the buried electrical wire. Over a training period of time, the animal become becomes familiar with the meaning of the audible sound and the general location of the buried wire. In this fashion the animal is trained to stay within a confined area by virtue of the audible signal and the electronic shock in the event that the animal gets too close to the buried wire.

Much of the background art discloses animal collars and their circuitry, means for applying electrical shocks and audible stimuli to the animal worn device, a wide variety of "buried wire" systems together with associated stationary transmitters. Further, several instances of portable transmitters are also illustrated for control of GPS, and for allowing animal trainers to administer shocks to animals when desired. Much of the circuitry in the references cited will be known by those skilled in the art to be applicable to the present invention.

However, animal owners cannot carry a buried wire wherever they go. On the other hand, animals are enriched by being allowed to run free under the guidance of their owners. Diligence is required to be certain that the animal does become separated from its owner beyond a comfortable distance.

With respect to objects, such as cameras, key chains, purses, and the like, diligence is required to keep track of where an object is placed to be certain it is not left behind when the owner moves to another location. Diligence is also required to be certain that an object is not intentionally or accidentally taken by a third party. While mechanical tethers can be attached between objects and the owners of the objects, it is not always possible to leave these mechanical tethers in place while performing normal activities.

There have been several devices heretofore known that have attempted to solve the problem of locating lost or misplaced items. The following prior art devices relate to systems and devices for object finding: A product marketed as the Magnavox remote locater; a product marketed as the Brookstone SmartFind remote control key finder; U.S. Pat. Nos. 5,638,050 and 5,686,891 relating specifically to a locating system for a remote control having a "home base"; and U.S. Pat. Nos. 5,204,657; 5,648,757 and 5,790,021. These prior known devices have suffered from one or more of several deficiencies.

With one recent exception, previous devices are single-use devices where only one object could be located with the system. The one recent exception is the Brookstone product that allows users to locate up to two objects. This system will not allow the user to keep track of more than two items. Also, this product only provides for key chain attachment, and does not allow for a more permanent and secure attachment to a variety of other commonly misplaced items, such as remote-control devices, cell phones, PDA's, pagers, electronic devices, etc. This, product also suffers from the multiple system interference problem described below, and also does not provide any means to prevent the misplacement of the transmitter itself. U.S. Pat. No. 6,674,364 sought to remedy these deficiencies by providing means for locating multiple devices.

Finding an object requires there be some perception that the object is missing. In the case of valuable objects, the delay in perception may be costly. How many times does a person notice many hours later, that a purse or other object has been left at a store or restaurant ? By that time, the object may be out of range of the finding device, either because the owner has left the vicinity of the object or the object has been removed from the vicinity of the owner. Various attempts have been made to solve this problem using powered transmitters and powered receivers. U.S. Pat. No. 6,075,443 issued to Schepps for a "Wireless Tether" uses a transmitter-receiver pair to establish proximity between a detector and at least two transmitters. The patent describes issuing an alarm if the detector does not detect any of the monitored devices. Schepps does not teach or describe identifying which device is causing an alarm to be issued. Schepps further suffers from the need to power both the transmitter and the detector.

What would be truly useful would be a system that comprises an "electronic leash" or "electronic tether" which can be variably preset by an animal or object owner and operated so as to prevent the animal or object from becoming separated from its owner. Such a system would further be capable of identifying a specific animal or object that is missing from a group of monitored animals or objects.

SUMMARY

Embodiments of the present invention provide systems and methods for issuing an alarm when the separation distance between a monitoring module associated with an object (animate or inanimate) and an alert module exceeds a preset threshold distance thereby forming an electronic tether between the object and the object owner.

It is therefore an aspect of the present invention to issue an alert to an object owner when the owner leaves an object behind.

It a further aspect of the present invention to issue an alert to an object owner when the object is separated from the object owner.

It is yet another aspect of the present invention to form an electronic tether between an owner of one or more objects and the objects without the need for a physical connection between the owner and the objects.

These and other aspects of the present invention will become apparent from the general and detailed descriptions that follow.

The present invention comprises an electronic tether comprising an alert module and a monitoring module. The monitoring modules (signal sources) are minimally sized so they can be attached, placed inside or incorporated into a variety of objects such as PDA's, cell phones, pagers, camera bags, purses, diaper bags, key chains, backpacks, etc. Each monitoring module comprises an addressable signal generator. By way of illustration and not as a limitation, the signal generator may produce an RF signal, an audio signal, or a magnetic field signal. The signal generator address may be preset or settable using means known in the art. The signal generator address associates the signal generator in the monitoring module with a monitored device in the alert module. An alternative embodiment of the present invention employs radio frequency identification (RFID) tags to give rise to the functionality described herein.

In an embodiment of the present invention, when a monitoring module is first powered on, the alert module "learns" the signal generator address using means known in the art. By way of example and not as a limitation, a monitored device on the owner alert device is selected and the monitoring module is placed in close proximity to the owner alert device. A "learn" button is pressed on the owner alert device and the address of the signal generator is saved and associated with the selected monitored device. Thereafter, when the owner leaves the area in which a monitored device is located, an alert is generated to the owner, which may be audible, visual, or tactile (as in the case of a vibrating device) to tell the owner he/she has left the monitored object behind. Corrective action to retrieve the device can then be taken. Similarly, if a monitored device is surreptitiously taken (as in a stolen handbag or camera), the increasing distance from the owner will cause an alert to be given to the owner to potentially thwart any theft.

DESCRIPTION OF THE FIGURES

FIGS. 2A and 2B illustrate an electronic tether that uses a spread spectrum signal according to embodiments of the present invention.

FIGS. 3A and 3B illustrate an electronic tether that uses an audio signal according to embodiments of the present invention.

DETAILED DESCRIPTION

Embodiments of the present invention provide systems and methods for issuing an alarm when the separation distance between a monitoring module associated with an object (animate or inanimate) and an alert module exceeds a preset threshold distance thereby forming a leadless electronic tether between the object and the object owner.

The Ser. No. 09/591,167 application (now U.S. Pat. No. 6,748,902) as incorporated herein by reference describes an animal training device comprising a power supply and a microprocessor. The microprocessor comprises processing capability and storage of variable parameters. The variable parameters are input by a variable setting means that can be a dial, digital setting or other types of setting means known in the art. When the trainer desires to set a specific radius distance, such as a distance in input in the variable setting thus providing instructions to the processor. Once the processor receives settings on the desired radius distance, the signal is sent to the transmitter to apply the appropriate power to the transmission as instructed by the processor. A signal is then transmitted that can be received by an animal device. Depending upon the radius distance set by the trainer, the transmitted signal will be stronger or weaker as desired.

The animal device is a self-contained unit that is worn on a collar or other attachment to the animal. The animal device receives the signal from the training device via an antenna. The antenna is connected to an internal receiver that has the capability of receiving and evaluating the signal strength so that the signal strength can be determined. Once the signal strength is determined it is provided to a logical elements in the animal device. The logical elements, which may be in the form of digital or analogue circuitry, interprets the signal strength and, depending upon the level of the signal strength, sends a signal to an audible alarm which in turn powers a speaker that provides an audible signal to the animal when the signal strength is at some intermediate or warning level.

In an alternative embodiment presented in the Ser. No. 09/591,167 application (now U.S. Pat. No. 6,748,902) the variable setting is established by virtue of setting a radius distance on the animal device rather than on the training device. In this embodiment, the training device architecture is simplified by eliminating the variable power setting in the transmitter. This embodiment of the training device comprises a power supply connected to a transmitter and an antenna.

The present invention utilizes an embodiment of the animal device (comprising a receiver) as an alert module and the simplified training device (comprising a signal generator) as the monitoring module. Together, these components provide an electronic tether.

Figure 1:
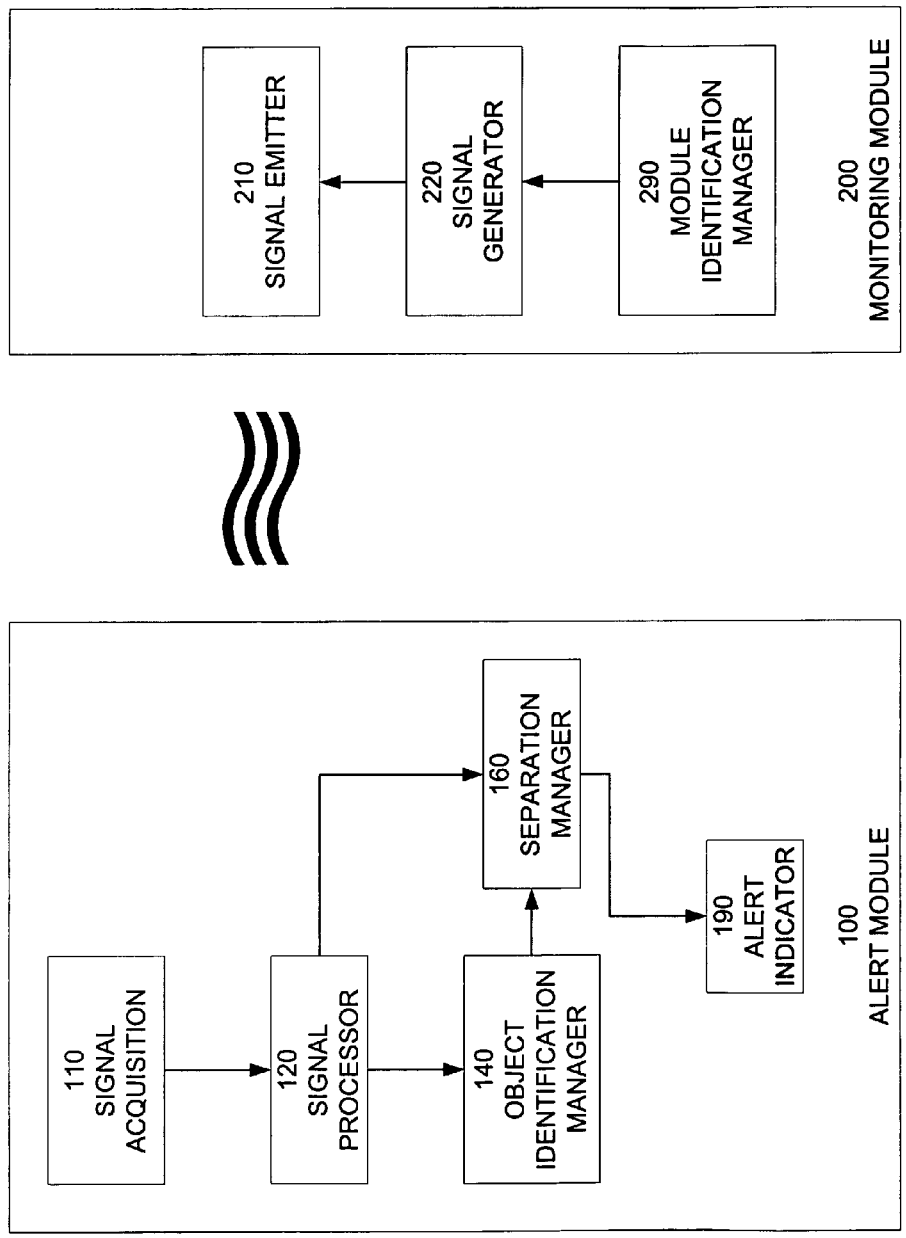
FIG. 1 illustrates the logical elements of a leadless electronic tether according to embodiments of the present invention.

FIG. 1 illustrates the logical elements of a leadless electronic tether according to embodiments of the present invention.

Referring to FIG. 1, an alert module 100 comprises a signal acquisition element 110, a signal processor 120, an object identification manager 140, a separation manager 160 and an alarm 190. The monitoring module 200 comprises a signal emitter 210, a signal generator 220, and module identification manager 290. In an embodiment of the present invention, the signal generator is adapted to emit a burst signal (in contrast to a continuous signal).

Signal acquisition element 110 receives the signal emitted by signal emitter 210. The signal acquisition element 110 comprises a device or devices appropriated to receive the signal generated by the signal generator 220. Signal emitter 210 receives the signal from signal generator 220. The signal comprises a monitoring module identifier provided by module identification manager 290. Referring again to the alert module 100, the signal from the signal acquisition element 110 is received and processed by signal processor 120. The processed signal is sent from signal processor 120 to an object identification manager 140 to obtain the monitoring module identifier. The signal is also provided to separation manager 160 to determine if the distance between the monitoring module and the alert module exceeds a preset separation distance. If the preset separation distance is exceeded, the separation manager sends an alert signal to alert indicator 190. In an embodiment of the present invention, the alert indicator 190 comprises an audible alarm and a visual indicator that identifies the particular monitoring module 200 that has exceed the preset separation distance. By way of illustration and not as a limitation, the visual indicator may be a LED indicator and/or an LCD display. In yet another embodiment, the alert indicator 190 comprises a voice synthesizer that announces that a tagged object has been left behind. Optionally, the tagged object is identified by name or a descriptor.

In an alternate embodiment (not illustrated), the object identification manager 140 and module identification manager 290 are not used. In this embodiment, the alert indicator is an audible alarm.

The logical elements illustrated in FIG. 1 are implemented by various embodiments of the present invention as will be described below. The embodiments described herein are exemplary only and are not intended to limit the present invention. As will be appreciated by those skilled in the art other means may be used to perform the tasks assigned to the logical elements without departing from the scope of the present invention.

Figure 2B:
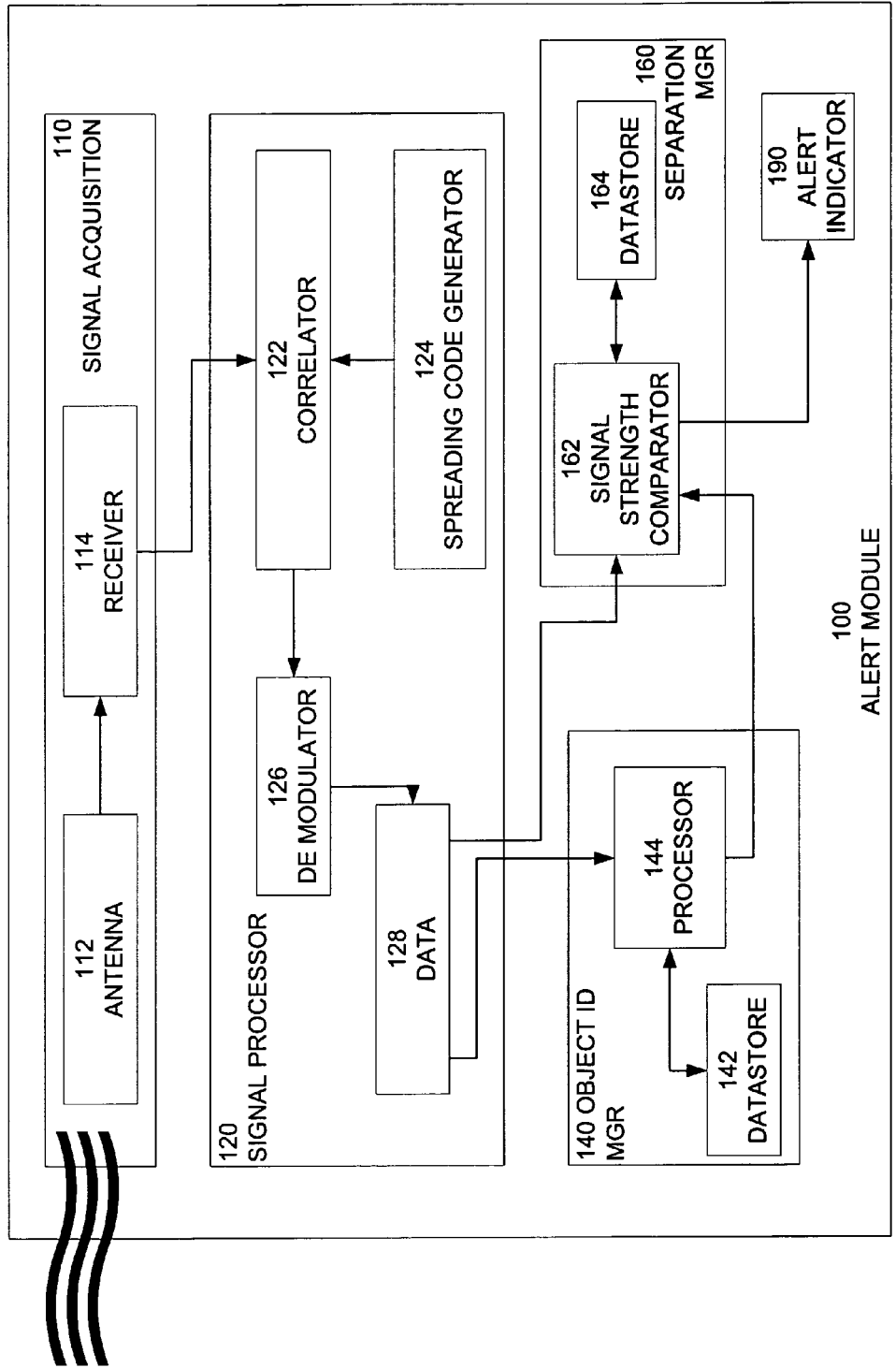

FIGS. 2A and 2B illustrate a leadless electronic tether that uses a spread spectrum signal according to embodiments of the present invention. Referring to FIG. 2A, a monitoring module 200 comprises a signal generator 220. Signal generator 220 comprises carrier generator 222 and data source 224. A signal from data source 224 is modulated by modulator 226 using a carrier signal from carrier generator 222. Modulator 228 using a spreading code signal produced by spreading code generator 230 then modulates the modulated data signal. The resulting spread spectrum signal is sent to signal emitter 210 and more specifically to antenna 212.

FIG. 2B illustrates an alert module 100 according to embodiments of the present invention. Signal acquisition element 110 comprises an antenna 112 and a receiver 114. The output of the receiver is a signal that is de-spread by correlator 122 using the same spreading code used by to spread the signal. This spreading code signal is produced by spreading code generator 124. The output of the correlator is demodulated by demodulator 126 to produce the original data stream 128 sent by monitoring module 200. In the case of spread spectrum, the key used for spreading and de-spreading can be used as the primary identification association between the two devices.

The data stream is sent to processor 144 where the module identifier code in the data stream is reconstructed and matched against tagged objects registered in datastore 142. The data stream is also sent to signal strength comparator 162 to determine whether the signal strength has decreased against a baseline stored in datastore 164 for the tagged object identified by the object identification manager 140. If a decrease is detected, the signal strength comparator determines whether the change exceeds a pre-determined threshold. In the event the signal strength has decreased by an amount exceeding the pre-determined threshold, an alert is sent to alert indicator 190.

The monitoring module 200 (FIG. 2A) comprises an address that is maintained by module identification manager 290 and received by data source 224. During an initialization process, object identification manager 140 associates an address of a particular monitoring module 200 with a tagged object (not shown) to which the monitoring module has been physically connected or in which the monitoring module has been incorporated. Referring also to FIG. 2B, during a monitoring session, the object identification manager 140 associates a processed signal from signal processor 120 with the tagged object associated with a particular monitoring module 200.

Prior to initiation of a monitoring session, alert module 100 initializes a signal strength from monitoring module 200. In an embodiment of the present invention, during this initialization process, the alert module 100 is placed at a maximum acceptable separation distance from monitoring module 200. Upon the start of the monitoring session, alert module separation manager receives a monitored signal having a signal strength that is indicative of a distance between the monitoring module and the alert module. If the signal strength of the monitored signal decreases below a threshold value (relative to the maximum separation distance established during initialization), separation manager 160 issues instructions to alert module 190.

Figure 3B:
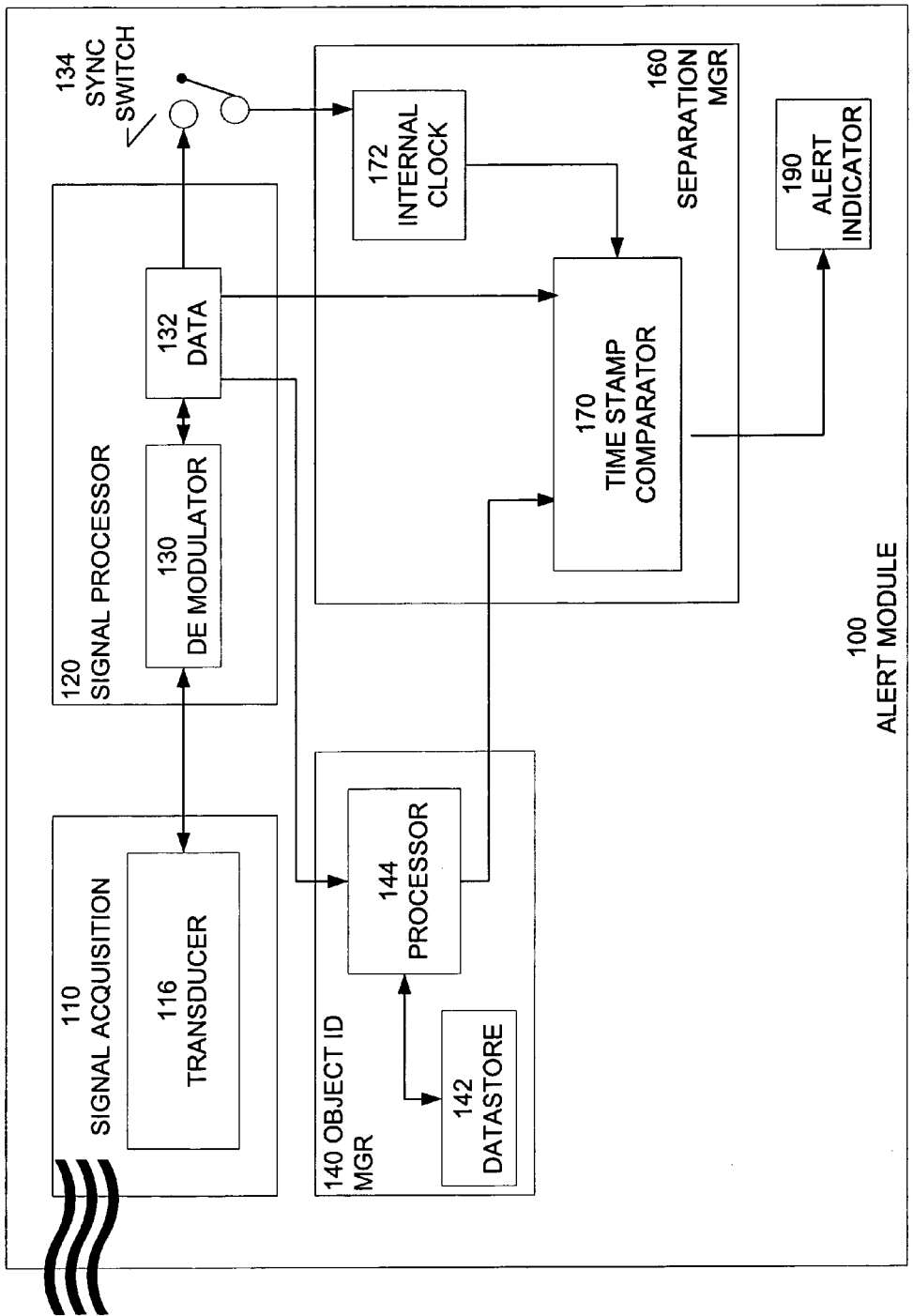

FIGS. 3A and 3B illustrate a leadless electronic tether that uses an audio signal according to embodiments of the present invention. Referring to FIG. 3A, a monitoring module 200 according to embodiments of the present invention is illustrated. A signal generator 220 comprises an audio generator 230, an internal clock 234, a data source 236 and a modulator 232. Modulator 232 receives a high frequency audio carrier from audio generator 230 and modulates the carrier with a data stream received from data source 236. The data stream comprises a monitoring module identifier from module identification manager 290 and a timestamp from internal clock 234. The resultant electrical signal is sent to transducer 216 where it is converted to a high frequency audio signal.

Referring to FIG. 3B, an alert module 100 is illustrated according to embodiments of the present invention. Signal acquisition element 110 comprises a transducer 116 that is adapted to receive the high frequency audio signal and convert that signal to an electrical signal. Signal processor 120 comprises a demodulator 130 demodulates the electrical signal to obtain the information encoded in the audio signal in the form of a data stream 132.

The data stream is sent to processor 144 where the module identifier code in the data stream is reconstructed and matched against tagged objects registered in datastore 142. The data stream is also sent to timestamp comparator 170 to that compares the timestamp of the monitoring module against a baseline timestamp stored in datastore 142 for the tagged object identified by the object identification manager 140.

The monitoring module 200 comprises an address that is maintained by module identification manager 290 and conveyed by signal generator 220 to the alert module 100. During an initialization process, object identification manager 140 associates an address of a particular monitoring module 200 with a tagged object (not shown) to which the monitoring module has been physically connected or in which the monitoring module has been incorporated. During a monitoring session, the object identification manager 140 associates a processed signal from signal processor 120 with the tagged object associated with a particular monitoring module 200.

Separation manager 160 comprises an internal clock. Prior to initiation of a monitoring session, alert module 100 receives an initialization timestamp from monitoring module 200. A clock in separation manager 160 associated with monitoring module 200 is synchronized with the initialization timestamp time via synchronization switch 134. In an embodiment of the present invention, during this synchronization processes, the alert module 100 is place proximate to monitoring module 200 to minimize the transit delay resulting from the passing of the audio signal through space.

The processed signal from signal processor 120 is evaluated by separation manager 160 to determine if a tagged object is no longer within a predetermined distance of the monitoring module. Upon the start of the monitoring session, timestamp comparator 170 receives a current timestamp from monitoring module 200 that reflects the incremental time that has passed since the synchronization process was completed plus the transit time of the audio signal through space. This transit time is reliably indicative of the distance between the monitoring module 200 and the alert module 100. Timestamp comparator 170 subtracts time indicated by the internal clock 172 in separation manager 160 associated with monitoring module 200 from the current timestamp and compares the difference to separation threshold value. If the time difference exceeds the threshold value, timestamp comparator 170 issues instructions to alert indicator 190.

An alternate to a clock in a round trip signal could be a phase-based signal. The received signal would be out of phase with the sent signal by some amount proportional to the distance between them. A similar feature detects relative motion rather than absolute distance using a Doppler effect. Using a tuned reflector on the monitored object, the rate at which the object it is moving towards or away from a sensor is detected. By integrating the relative motion, the approximate separation distance can be computed. Additionally, the fact that the distance between the device and the alert module is increasing may be determined and used to issue an alert.

The embodiments described herein are exemplary only and are not intended to limit the present invention. As will be appreciated by those skilled in the art other means may be used to perform the tasks assigned to the logical elements without departing from the scope of the present invention. By way of illustration and not as a limitation, monitoring module 200 comprises a passive responder that responds with a signal burst when queried by alert module 100. In this embodiment of the present invention, alert module 100 comprises an alerting means that queries monitoring module 200.

Figure 4:
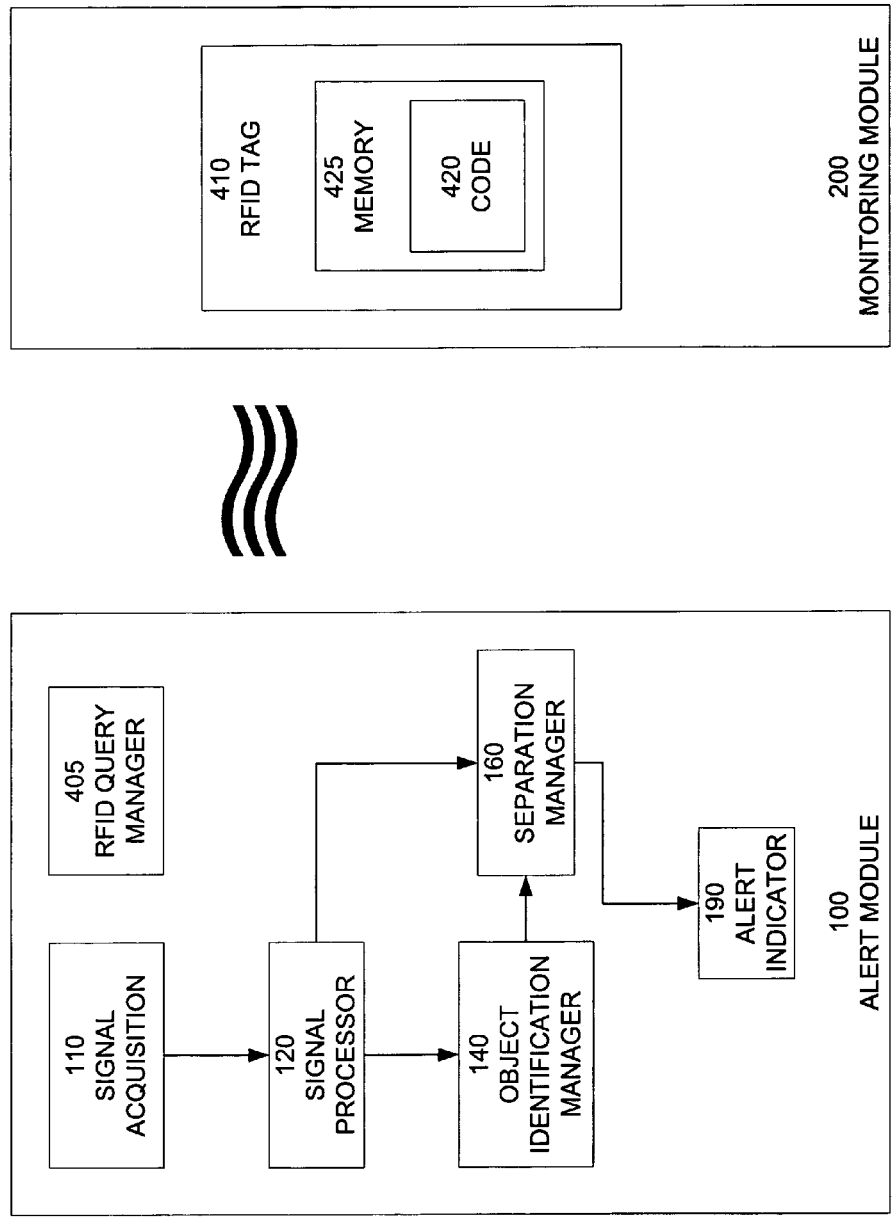
FIG. 4 illustrates the logical elements of a leadless electronic tether utilizing an RFID tag according to embodiments of the present invention.

FIG. 4 illustrates the logical elements of a leadless electronic tether utilizing an RFID tag according to embodiments of the present invention. Referring to FIG. 4, an alert module 100 comprises a signal acquisition element 110, a signal processor 120, an object identification manager 140, a separation manager 160, an alarm 190, and an RFID tag query manager 405. The monitoring module 200 comprises an RFID tag 410. In the embodiment illustrated in FIG. 4, RFID tag 410 is a passive device. However, the present invention is not so limited. Semi-passive or active RFID tags may be utilized in monitoring module 200 without departing from the scope of the present invention. RFID tag 410 comprises memory 415 in which code 420 is stored. Memory 415 may be either a read only memory or programmable read/write memory.

RFID query manager 405 sends a query signal during a preset time period. In another embodiment of the present invention, the power of the query signal sent by query manager 405 may be adjusted. The query signal is received by RFID tag 410 and reflected back to alert module 100. The reflected signal comprises the code 420 stored in memory 415. Signal acquisition element 110 receives the reflected signal emitted by RFID tag 410. The signal acquisition element 110 comprises a device or devices appropriated to receive the signal generated by RFID tag 410. In an embodiment of the present invention, the sensitivity of the signal acquisition element 110 may be adjusted. The reflected signal from the signal acquisition element 110 is received and processed by signal processor 120. The processed signal is sent from signal processor 120 to an object identification manager 140 to obtain the monitoring module identifier. The signal is also provided to separation manager 160 to determine if the distance between the monitoring module and the alert module exceeds a preset separation distance. If the preset separation distance is exceeded, the separation manager sends an alert signal to alert indicator 190. In one embodiment of the present invention, separation manager 160 determines that the preset separation distance has been exceeded based on a lack of a reflected signal from RFID tag 410.

In another embodiment, separation manager 160 uses the signal strength of the reflected signal to determine that the preset separation distance has been exceeded. In conjunction with the variable power of the query signal emitted by query manager 405 and the variable sensitivity of the signal acquisition element 110, the separation distance threshold may be adjusted. As will be appreciated by those skilled in the art, that other means may be used to determine that the preset separation distance has been exceeded without departing from the scope of the present invention.

In an embodiment of the present invention, the alert indicator 190 comprises an audible alarm and a visual indicator that identifies the particular monitoring module 200 that has exceed the preset separation distance. By way of illustration and not as a limitation, the visual indicator may be a LED indicator and/or an LCD display. In yet another embodiment, the alert indicator 190 comprises a voice synthesizer that announces that a tagged object has been left behind. Optionally, the tagged object is identified by name or a descriptor.

Embodiments of the present invention may be incorporated into other devices without departing from its scope. By way of illustration, an alert module may be incorporated into a cellular telephone, a PDA, a laptop computer, a portable music device, or a wrist watch.

In still another embodiment of the present invention, an alert module is adapted to permit a user to cancel an alert when a monitored object is "released" from monitoring and to provide a second alert when the monitored object again is in proximity to the alert module. For example, a bag may be checked at the airport. When the bag is within a predetermined separation distance of the alert module in the baggage return area of the airport, an alert is issued by the alert module.

Systems and methods for providing an electronic tether have been illustrated. It will be understood by those skilled in the art of the present invention that the systems and methods of the present invention can be used with or without identifying a module. Thus the invention will be useful in providing a simple electronic tether comprising a single alert module and a single monitoring module. Further, although the claims herein discuss the electronic tether in terms of a single monitoring module, this is not meant as a limitation. The present invention anticipates that multiple monitoring modules are to be used in preferred embodiments, the number of which will vary depending on the size of the alert module and production costs. Additionally, the systems and methods may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible.

We claim:

1. An electronic tether comprising:
   a monitoring module comprising an RFID tag adapted to receive a polling signal and to transmit a reflected signal in response to the polling signal, wherein the reflected signal comprises an identifier unique to the RFID tag; and
   an alert module consisting of:
      an RFID tag polling manager adapted to send the polling signal;
      a receiver adapted to receive the reflected signal from the RFID tag and wherein the alert module is adapted to:
         acquire the RFID tag identifier from the reflected signal;
         determine that a separation distance between the monitoring module and the alert module exceeds a preset separation distance based on the non-presence of the reflected signal from the RFID tag; and
         issue an alert when the separation distance exceeds the preset separation distance.

2. The electronic tether of claim 1, wherein the alert module comprises a record of the identifier and wherein the alert module is further adapted to determine that the separation distance between the monitoring module and the alert module exceeds the preset separation distance based on the non-presence of the identifier.

3. The electronic tether of claim 1, wherein the alert is an audible alarm.

4. The electronic tether of claim 3, wherein the audible alarm is a synthesized voice.

5. The electronic tether of claim 1, wherein the alert is a visual alarm.

6. The electronic tether of claim 5, wherein the visual alarm is a text message.

7. The electronic tether of claim 1, wherein the alert module is further adapted to:
   accept an alarm cancel request from a user;
   determine when the separation distance no longer exceeds the preset separation distance; and
   issue an object return alert.

8. The electronic tether of claim 1, wherein the alert module is incorporated into a portable device.

9. The electronic tether of claim 8, wherein the portable device is selected from the group consisting of a cellular telephone, a PDA, a laptop computer, a portable music player, and a wristwatch.

10. The electronic tether of claim 1, wherein the polling manager comprises means for varying the polling signal signal strength.

11. The electronic tether of claim 10, wherein the preset separation distance is established by adjusting the polling signal signal strength.

12. The electronic tether of claim 1, wherein the receiver comprises means for varying the receiver sensitivity to the reflected signal.

13. The electronic tether of claim 12, wherein the preset separation distance is established by adjusting the receiver sensitivity.

14. The electronic tether of claim 1, wherein the RFID tag is selected from the group consisting of a passive RFID tag, a semi-passive RFID tag, and an active RFID tag.

15. The electronic tether of claim 1, wherein the alert module is further adapted to:
   in response to an alert, identify the RFID tag as non-responsive;
   resend the polling signal to the non-responsive RFID tag; and
   if the non-responsive RFID tag fails to respond after a preset number of resend attempts, then issue an alarm.

16. An electronic tether comprising:
   a monitoring module comprising at least first and second RFID tags adapted to receive a polling signal and to transmit a first reflected signal and a second reflected signal in response to the polling signal, wherein the first reflected signal comprises a first identifier unique to the first RFID tag and the second reflected signal comprises a second identifier unique to the second RFID tag; and
   an alert module consisting of:
      an RFID tag polling manager adapted to send the polling signal;
      a receiver adapted to receive the first and second reflected signals from the first and second RFID tags and wherein the alert module is adapted to:
         acquire the first and second RFID tag identifiers from the first and second reflected signals;
         determine that a first separation distance between the monitoring module and the first alert module exceeds a first preset separation distance based on the non-presence of the first reflected signal from the first RFID tag and issue a first alert with respect to the first RFID tag when the first separation distance exceeds the first preset separation distance; and
         determine that a second separation distance between the monitoring module and the second alert module exceeds a second preset separation distance based on the non-presence of the second reflected signal from the second RFID and issue a second alert with respect to the second RFID tag when the second separation distance exceeds the second preset separation distance.

17. The electronic tether of claim 16, wherein the alert module comprises a record of the first and second identifiers and wherein alert module is further adapted to determine that the first separation distance between the monitoring module and the first alert module exceeds the first preset separation distance based on the non-presence of the first identifier and further adapted to determine that the second separation distance between the monitoring module and the second alert module exceeds the second preset separation distance based on the non-presence of the second identifier.

18. The electronic tether of claim 16, wherein the first alert and the second alert is an audible alarm.

19. The electronic tether of claim 18, wherein the audible alarm is a synthesized voice.

20. The electronic tether of claim 16, wherein the first alert and second alert are visual alarms.

21. The electronic tether of claim 20, wherein a visual alarm is a text message.

22. The electronic tether of claim 16, wherein the alert module is further adapted to:
    accept an alarm cancel request from a user with respect to the first alert module; determine when the first separation distance no longer exceeds the first preset separation distance; and
    issue an object return alert with respect to the first alert module.

23. The electronic tether of claim 16, wherein the alert module is incorporated into a portable device.

24. The electronic tether of claim 23, wherein the portable device is selected from the group consisting of a cellular telephone, a PDA, a laptop computer, a portable music player, and a wristwatch.

25. The electronic tether of claim 16, wherein the polling manager comprises means for varying the polling signal signal strength.

26. The electronic tether of claim 25, wherein the preset separation distance is established by adusting the polling signal signal strength.

27. The electronic tether of claim 16, wherein the receiver comprises means for varying the receiver sensitivity to the reflected signal.

28. The electronic tether of claim 27, wherein a preset separation distance is established by adjusting the receiver sensitivity.

29. The electronic tether of claim 16, wherein the at least first and second RFID tags are selected from the group consisting of a passive RFID tag, a semi-passive RFID tag, and an active RFID tag.

30. The electronic tether of claim 16, wherein the alert module is further adapted to:
    in response to an alert, identify an RFID tag as non-responsive;
    resend the polling signal to the non-responsive RFID tag; and
    if the non-responsive first RFID tag fails to respond after a preset number of resend attempts, then issue an alarm.

31. The electronic tether of claim 16, wherein the alert module is further adapted to:
    in response to an alert, identify an RFID tag as non-responsive;
    increase the polling signal signal strength by a preset increment;
    resend the polling signal to the non-responsive RFID tag; and
    if the non-responsive RFID tag fails to respond after polling signal signal strength reaches a maximum signal strength level, then issue an alarm.

32. The electronic tether of claim 16, wherein the alert module is further adapted to:
    in response to an alert, identify an RFID tag as non-responsive;
    increase the receiver sensitivity by a preset increment;
    resend the polling signal to the non-responsive RFID tag; and
    if the non-responsive RFID tag fails to respond after receiver sensitivity reaches a maximum sensitivity, then issue an alarm.

33. The electronic tether of claim 1, wherein the alert module is further adapted to:
    in response to an alert, identify the RFID tag as non-responsive;
    increase the polling signal signal strength by a preset increment;
    resend the polling signal to the non-responsive RFID tag; and
    if the non-responsive RFID tag fails to respond after polling signal signal strength reaches a maximum signal strength level, then issue an alarm.

34. The electronic tether of claim 1, wherein the alert module is further adapted to:
    in response to an alert, identify the RFID tag as non-responsive;
    increase the receiver sensitivity by a preset increment;
    resend the polling signal to the non-responsive RFID tag; and
    if the non-responsive RFID tag fails to respond after receiver sensitivity reaches a maximum sensitivity, then issue an alarm.

35. The electronic tether of claim 1, wherein the preset separation distance is established by selection of the RFID tag.

36. The electronic tether of claim 16, wherein:
    the first preset preset separation distance is established by selection of the first RFID tag; and
    the second preset preset separation distance is established by selection of the RFID tag.

37. The electronic tether of claim 36, wherein the first and second RFID tags are associated with an object and wherein the monitoring module is further adapted to:
    issue a warning when the object enters the first missing zone; and
    issue an alarm when the object enters the second missing zone.

38. An electronic tether comprising:
    a monitoring module comprising an RFID tag adapted to receive a polling signal and to transmit a reflected signal, wherein the reflected signal consisting of an identifier unique to the RFID tag; and
    an alert module comprising and RFID tag polling manager, a receiver, and means to adjust a preset separation distance, and wherein:
        the RFID tag polling manager is adapted to send the polling signal;
        the receiver adapted to receive the reflected signal from the RFID tag; and
        the alert module is adapted to:
            acquire the RFID tag identifier from the reflected signal;
            determine that a separation distance between the monitoring module and the alert module exceeds the preset separation distance based on the non-presence of the reflected signal from the RFID tag; and
            issue an alert when the separation distance exceeds the preset separation distance.

39. The electronic tether of claim 38, wherein the alert module comprises a record of the identifier and wherein alert module is further adapted to determine that the separation distance between the monitoring module and the alert module exceeds the preset separation distance based on the non-presence of the identifier.

40. The electronic tether of claim 38, wherein the means to adjust the preset separation distance comprises adjusting the polling signal signal strength.

41. The electronic tether of claim 38, wherein the means to adjust the preset separation distance comprises adjusting the receiver sensitivity to the reflected signal.

42. The electronic tether of claim 1, wherein the preset separation distance is established by selection of the RFID tag.

* * * * *